United States Patent
Wang et al.

(10) Patent No.: US 10,368,056 B2
(45) Date of Patent: Jul. 30, 2019

(54) DEPTH DATA DETECTION AND MONITORING APPARATUS

(71) Applicant: SHANGHAI PERCIPIO TECHNOLOGY LIMITED, Shanghai (CN)

(72) Inventors: Minjie Wang, Shanghai (CN); Yushi Liang, Shanghai (CN)

(73) Assignee: SHANGHAI PERCIPIO TECHNOLOGY LIMITED, Shanghai (CN)

( * ) Notice: Subject to any disclaimer, the term of this patent is extended or adjusted under 35 U.S.C. 154(b) by 72 days.

(21) Appl. No.: 15/737,342

(22) PCT Filed: Jun. 17, 2016

(86) PCT No.: PCT/CN2016/086237
§ 371 (c)(1),
(2) Date: Dec. 18, 2017

(87) PCT Pub. No.: WO2016/202295
PCT Pub. Date: Dec. 22, 2016

(65) Prior Publication Data
US 2018/0176544 A1   Jun. 21, 2018

(30) Foreign Application Priority Data

Jun. 19, 2015 (CN) .......................... 2015 1 0347816
Dec. 8, 2015 (CN) .......................... 2015 1 0897874
Jan. 16, 2016 (CN) .......................... 2016 1 0029434

(51) Int. Cl.
*H04N 13/271* (2018.01)
*H04N 5/33* (2006.01)
(Continued)

(52) U.S. Cl.
CPC .......... *H04N 13/271* (2018.05); *G01B 11/22* (2013.01); *G01B 11/25* (2013.01);
(Continued)

(58) Field of Classification Search
None
See application file for complete search history.

(56) References Cited

U.S. PATENT DOCUMENTS 9,233,470 B1 * 1/2016 Bradski .................... B25J 9/163
2014/0240464 A1   8/2014 Lee
(Continued)

FOREIGN PATENT DOCUMENTS

CN   201947514 U   8/2011
CN   102588798 A   7/2012
(Continued)

*Primary Examiner* — Christopher Braniff
(74) *Attorney, Agent, or Firm* — IPro, PLLC; Qian Gu; Na Xu (57) ABSTRACT

A depth data detection apparatus and monitoring apparatus are disclosed. The depth data detection apparatus has at least two infrared light generators (11, 12) alternately operating, thereby ensuring that each of the infrared light generators has a sufficient power-off time while ensuring continuous operation of the system, so that each infrared light generator can reach its service lift as much as possible. Different infrared light generators can project infrared beams with different angles and/or from different positions, and the depth information obtained can be fused with each other in order to acquire the depth information of the object to be measured more completely. In addition, different infrared light generators can also project infrared beams to different areas or the same area of the space to be measured for their respective purposes.

17 Claims, 4 Drawing Sheets

(51) Int. Cl.

| | |
|---|---|
| *H04N 5/232* | (2006.01) |
| *G01B 11/25* | (2006.01) |
| *H04N 13/254* | (2018.01) |
| *H04N 7/18* | (2006.01) |
| *G08B 13/19* | (2006.01) |
| *G08B 29/04* | (2006.01) |
| *H04N 17/00* | (2006.01) |
| *G01B 11/22* | (2006.01) |

(52) U.S. Cl.
CPC .......... *G01B 11/2513* (2013.01); *G08B 13/19* (2013.01); *G08B 29/04* (2013.01); *H04N 5/232* (2013.01); *H04N 5/33* (2013.01); *H04N 5/332* (2013.01); *H04N 7/181* (2013.01); *H04N 13/254* (2018.05); *H04N 17/002* (2013.01)

(56) References Cited

U.S. PATENT DOCUMENTS

2014/0376092 A1* 12/2014 Mor ................... G01B 11/2513
359/569
2016/0150219 A1* 5/2016 Gordon .............. G01B 11/2513
348/46

FOREIGN PATENT DOCUMENTS

| CN | 103796004 A | 5/2014 |
| CN | 104634276 A | 5/2015 |
| CN | 105004282 A | 10/2015 |
| CN | 105357511 A | 2/2016 |
| CN | 105554470 A | 5/2016 |
| WO | 2015199615 A1 | 12/2015 |

\* cited by examiner

FIG.12

DEPTH DATA DETECTION AND MONITORING APPARATUS

TECHNICAL FIELD

The present invention relates to the field of three-dimensional detection technology, and in particular, to apparatus for depth data detection and monitoring.

BACKGROUND

Three-dimensional information can also be referred to depth information or depth of field information. The traditional method of image capture can only obtain the two-dimensional information of an object and can not obtain the spatial depth information of an object, however, the spatial depth of object surface information, especially obtaining the depth information in real-time, plays a crucial role in a variety of industrial, daily and entertainment applications.

The existing depth detection apparatus generally uses an auxiliary discrete light source, such as structured light, for illumination, and calculates the depth information of the surface of the measured object by detecting the phase shift of the structured light. In brief, first, a two-dimensional laser texture pattern with coded information, such as a discrete speckle pattern, is projected onto the surface of the object to be measured, and another image capturing device with a relatively fixed position continuously acquires the laser texture. The processing unit then compares the acquired laser texture sequence with a reference surface texture sequence of a known depth distance pre-stored in a memory to calculate the depth distance of each laser texture sequence segment projected on the surface of the object, and further obtains the 3D data of the surface of the object to be measured. The three-dimensional measurement technique based on this structured light detection uses the method of parallel image processing, which can detect the depth information of the object to be detected to a certain extent.

However, the existing apparatus for detecting depth still has several deficiencies. First, the relative position of the laser and the image capturing device needs to be calibrated by acquiring the reference surface multiple times. Since the laser is a consumable element, once the laser is damaged and replaced, the relative position of the laser and the image capturing device needs to be calibrated, which will increase the equipment maintenance costs. Second, as the device operates with a single laser, when continuously measured over a long period of time, the aging of the laser will accelerate, far beyond the normal lifetime of the laser (typically, the lifetime of the laser is from 10,000 to 20,000 hours), thus shortening the service life of the equipment, increasing the equipment maintenance cost and reducing the feasibility of the deep data detection apparatus applied in the field which long-time reliable operation is needed, such as security monitoring. Third, the device can only detect the depth data at the position where the texture segment exists on the object to be detected, but can not accurately obtain the depth data at the position where the texture segment is not projected on the object to be detected. Lastly, for security monitoring applications, the intensity of the light projected by the lighting system to the monitoring space that is far away is weaker, so that the distance that can be monitored is limited. Increasing the power of the lighting system will in turn cause energy waste and increases costs.

Therefore, there is a need for improved depth data detection and monitoring apparatus.

SUMMARY

Embodiments of the present invention overcome the above and various other disadvantages of the prior art and provide an improved depth data detection apparatus and a monitoring system using depth data. According to one aspect of the present invention, the depth data detection apparatus of the present invention has at least two infrared light generators alternately in operation, thereby increasing the power-off time of each infrared light generator while ensuring the continuous operation of the system, which allows each infrared light generator to achieve its lifetime as long as possible. A different infrared light generators can project infrared beams with a different projection angle and/or from a different position, and the depth information thus obtained can be fused with each other in order to acquire the depth information of the object to be measured more completely. In addition, different infrared light generators can project infrared beams to the same or different areas of the space to be measured. In the depth data monitoring apparatus according to the present invention, infrared light beams can be projected by different infrared light generators to different projection areas in the monitoring space, so as to achieve the monitoring with the widest range/highest intensity under the same power conditions, and capable of avoid the deterioration of the projector due to the continuous operation for a long time.

The above and other objects, features and advantages of the present disclosure will become more apparent from the following more detailed description of the exemplary embodiments of the present invention, as illustrated in the accompanying drawings.

BRIEF DESCRIPTION OF THE DRAWINGS

In the exemplary embodiments of the present invention, the same reference numerals generally represent the same components.

DETAILED DESCRIPTION

Hereinafter, preferred embodiments of the present disclosure will be described in more detail with reference to the accompanying drawings. Although the drawings illustrate the preferred embodiments of the present disclosure, it should be understood that the disclosure may be implemented in various forms and should not be limited to the embodiments set forth herein. Rather, these embodiments are provided so that this disclosure will be thorough and complete, and will fully convey the scope of the disclosure to those skilled in the art.

In order to facilitate a better understanding of the present invention, the operating principle of the depth data detection apparatus of the present invention will be briefly described.

The invention adopts auxiliary laser to transmit the random texture with coded information to the object surface in space and realizes real-time capture of laser-coded images reflected from the object surface by two image sensors spatially located in different locations. By comparing the disparity of the same position in the two images simultaneously captured from different positions, the depth information of the position can be calculated in real time.

First Embodiment

Figure 1:
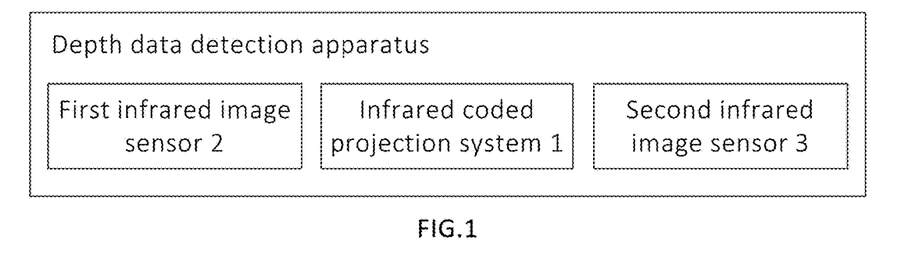
FIG. 1 is a schematic block diagram of a depth information detection apparatus according to one embodiment of the present invention.

FIG. 1 is a schematic block diagram of a depth information detection apparatus according to an embodiment of the present invention. As shown in FIG. 1, the depth data detection apparatus includes an infrared coded projection system 1, a first infrared image sensor 2 and a second infrared image sensor 3.

The infrared coded projection system 1 is configured to project textured infrared beams to the space to be measured so as to form randomly distributed infrared textures on the object to be detected in the space to be measured.

The first infrared image sensor 2 and the second infrared image sensor 3 have a predetermined relative spatial position relationship therebetween, and the first infrared image sensor 2 and the second infrared image sensor 3 are configured to respectively image the space to be measured. Since the object to be detected has infrared texture thereon, the images obtained by the first infrared image sensor 2 and the second infrared image sensor 3 are two infrared textured images.

Depth data of the infrared textures relative to the two infrared light image sensors can be determined based on the predetermined relative spatial position relationship between the first infrared image sensor 2 and the second infrared image sensor 3 and the position difference of the texture segment images correspondingly formed in the two infrared texture images by the same texture segment in the infrared textures.

For example, when the infrared texture is a discrete light beam, a discrete light beam irradiates the surface of the object to be measured to form speckles. Then, the first infrared image sensor 2 and the second infrared image sensor 3 image the space to be measured to obtain speckles images, measuring the position difference of the speckle formed by the same speckle on the surface of the object correspondingly in the infrared images acquired by the two infrared image sensors and the predetermined relative spatial position between the two infrared image sensors can determine that the depth data of the speckle relative to the two infrared image sensors, that is, the depth data of the surface of the object where the speckle is located, and thus the depth data of the object to be detected can be obtained by multiple speckles.

When two infrared image sensors continuous image the space to be measured, the two infrared image sensors can capture the space synchronously or asynchronously.

When the two infrared image sensors capture synchronously, the captured images can describe the environmental changes at the same time. When the captured images are not synchronized, the captured images describe the environmental changes at different times. In this case, the depth data is analyzed and detected based on the image captured asynchronously, and the result may be biased. The motion compensation can be used to solve the problem that the depth-of-field deviation is caused by the asynchronized image sensor. Therefore, in the actual measurement, it is preferable to use two infrared image sensors to capture synchronously.

Figure 2:
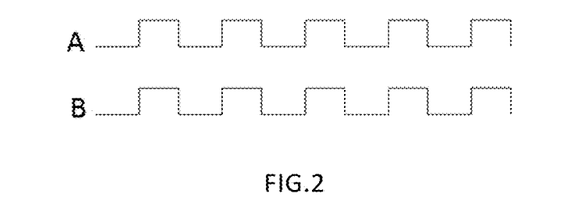
FIG. 2 shows frame rate sequence diagrams of the two infrared image sensor.

FIG. 2 is a schematic diagram of the frame rate sequence when two infrared image sensors capture synchronously, where A represents a frame rate sequence of the first infrared image generator 2 and B represents a frame rate sequence of the second infrared image generator 3, and frame rate refers to the number of frames or images captured by the image sensor per second.

Figure 3:
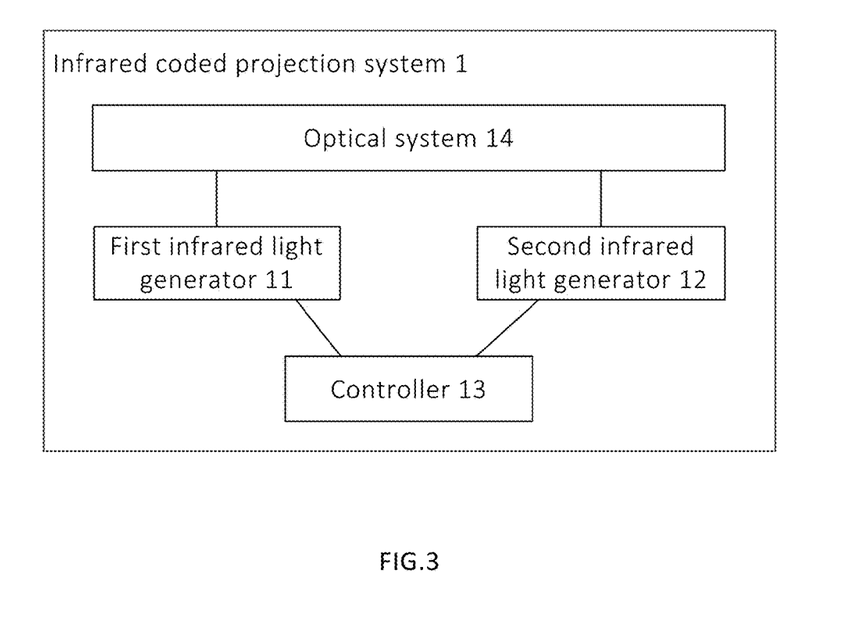
FIG. 3 is a schematic block diagram of an infrared coded projection system according to one embodiment of the present invention.

FIG. 3 is a schematic block diagram of the structure of the infrared coded projection system in FIG. 1. As shown in FIG. 3, the infrared coded projection system 1 includes a first infrared light generator 11, a second infrared light generator 12, a controller 13, and an optical system 14.

The first infrared light generator 11 and the second infrared light generator 12 are used to generate infrared light. For example, the first infrared light generator 11 and the second infrared light generator 12 may use infrared laser diodes to generate infrared light.

The optical system 14 is used for generating the beams with the texture information from the infrared light generated by the first infrared light generator 11 and the second infrared light generator 12. The optical system 14 can design and process different random textures by using the existing processing technologies. For example, the texture can be a discrete beam.

The following will use the discrete beam as an example for texture to describe the projection process of the infrared coded projection system 1 of the present invention in detail.

The optical system 14 in the infrared coded projection system 1 is configured to split the light emitted by the first infrared light generator 11 and the second infrared light generator 12. In this case, the light emitted by the first infrared light generator 11 and the second infrared light generator 12 can be split by an optical system or by two optical systems. The optical system 14 may be designed as one optical element capable of scattering laser light into random speckles, such as a diffraction grating. In addition, a beam splitter made of a diffractive element, such as quartz glass, polycarbonate or the like, can be used. By nano-etching or embossing the surface of the element, the element enables directional scattering of the projected laser beam. Thus, the infrared light generated by the first infrared light generator 11 and the second infrared light generator 12 is splitted by the optical system 14 and form an infrared discrete light beam which is distributed into the space to be measured.

In the following, a brief description will be made on the projection process of the infrared light, in which an infrared laser diode is used as the first infrared light generator 11 and a second infrared light generator 12, and a beam splitter is used as the optical system 14 as an example.

The infrared laser diode is used for emitting an infrared laser beam, and the emitted infrared laser beam is divided into a plurality of laser beams by the beam splitter to irradiate the space to be measured, and form a plurality of infrared speckles on the object to be detected in the space to be measured.

The controller 13 is used for controlling and switching the operating states of the first infrared light generator 11 and the second infrared light generator 12 such that the two infrared light generators generate infrared light alternately. More specifically, the controller 13 performs switching by transmitting a switching signal to the first infrared light generator 11 and the second infrared light generator 12 so that the first infrared light generator 11 stops emitting light in response to the switching signal, and the second The infrared light generator 12 starts emitting light in response to the switching signal.

In this way, under the control of the controller 13, the first infrared light generator 11 and the second infrared light generator 12 operate alternately. Compared with using only one infrared light generator, it is possible to avoid the overload caused by the continuous operation of the infrared light generator, increasing the power off time of the infrared light generator, so that the two infrared light generators both can reach their lifetimes as much as possible, thereby reducing the maintenance cost and expanding the application field of the apparatus.

In addition, it should be noted that the number of infrared light generators shown in FIG. 3 is only for better explaining the present invention rather than limiting the present invention. Based on the principle of the present invention, the number of infrared light generators may also be three, four and so forth, all of which are within the scope of the present invention.

In addition, while the controller is shown in FIG. 3 as being located within the infrared coded projection system, the controller for controlling the infrared light generator may also be located at any other location of the apparatus.

Likewise, although FIG. 3 shows only a single optical system, it is understood that it is also possible to equip each infrared light generator with an optical system alone.

Also need to point out that the existing three-dimensional detection technology continuous acquires laser texture on the surface of the object to be detected by a single imaging device, and then compare it with the pre-stored reference image to obtain the three-dimensional data of the object. In this case, multiple laser projection devices can not operate alternately. Because when two or more devices have overlapping laser projections, the laser texture captured by the image capturing device is different with the initial calibrated reference surface texture data, then the image matching will fail, and the three-dimensional data of the surface of the object to be detected can not be calculated correctly.

In contrast, the present invention employs two infrared image sensors to detect the random infrared texture on the surface of the object, and determines 3D data of the infrared textures relative to the two infrared image sensors based on the position difference of the texture segment images correspondingly formed in the two infrared texture images by the same texture segment in the infrared textures and the predetermined relative spatial position relationship between the two infrared image sensors.

Therefore, in the present invention, the randomly distributed infrared texture formed on the surface of the object to be detected by the infrared light generator is used only for identification and does not need to be compared with a pre-stored reference image, as long as it can distinguish each texture segment from randomly distributed infrared textures. Thus the position requirement of the infrared light generator is not stringent in the present invention. In general, the spatial relationship between the infrared light generator and the first and second infrared image sensor may be arbitrary, as long as the projection area of the infrared laser generator through the optical system completely covers the common view of the first image sensor and the second image sensor.

In the actual depth measurement, the random infrared texture can be encoded, that is, the random infrared texture projected to the space to be measured has encoded information. Since different infrared light generators are installed at different positions, the image sensor captures different infrared code when different infrared light generator operates. In order to facilitate post-processing, the image sensor needs to collect a complete infrared coded pattern in one frame, and it is best to make the image sensor and infrared light generator operate simultaneously, that is, when a different infrared light generator is switch to operate, a new image exposure is started by the image sensor.

When the two image sensors capture asynchonously, it is preferable that to set the light emitting frequency of the infrared light generators as an integral multiple of the frame rate of both image sensors, or the light emitting frequency of the infrared light generators can be set as an integral multiple of the frame rate of one image sensor. Therefore, the light emitting frequency of the infrared light generator is greater than the frame rate of the image sensor and is an integer multiple of the frame rate of the image sensor.

Figure 4:
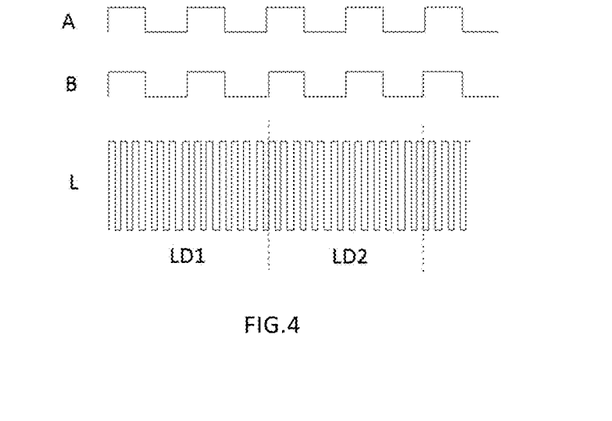
FIG. 4 shows frame rate sequence diagrams of the two infrared image sensor and a operating sequence diagram of infrared light generator.

FIG. 4 is a schematic diagram of frame rate sequence of two infrared image sensors and an operation sequence of an infrared light generator when two image sensors capture synchronously, where A indicates a frame rate sequence of the first infrared image generator 2, B indicates a frame rate sequence of the second infrared image generator 3, L indicates light emitting frequency sequence of the infrared light generator, and the light emitting frequency refers to the number of light pulses emitted by the infrared light generator per unit time. LD1 and LD2 indicate the two infrared light generator operate alternately, and the light emitting frequency of each infrared light generator is greater than the frame rate of the image sensor and is an integral multiple of the frame rate of the image sensor.

The ratio of the light emitting frequency of the infrared light generator to the frame rate of the image sensor is preferably large, because if the light emitting frequency is close to the sensor frequency, the image acquired by the sensor may appear unstable in quality such as streaks; if it is much larger than sensor frequency, laser light is constant light source relative to the sensor, there will be no flicker, the image quality of the acquired images is relatively stable, which can enhance the accuracy of the depth data detection. The image sensor frame rate is generally 30 Hz and thus, in practical detection, the light-emitting frequency of the infrared light generator may be set to be more than 100 Hz, so that the laser light can be ensured to be a constant light source relative to the sensor.

In the actual detection, in order to reduce the infrared light generator damage caused by the frequent switch, each operating duration of each infrared light generator is set to cover a plurality of frame periods of the infrared image sensor, the frame period corresponds to the above frame rate, that is, the time required for the infrared image sensor to obtain one frame of image.

However, in practical, since the image sensor is imaged at a frequency of, for example, 29 or 30 frames or even a dozen frames per second and the infrared light generator emits light at a higher frequency (for example, several hundreds or even thousands of Hz), the synchronization and the multiple of the frequency between the image sensor and the infrared light generator can be ignored, and relatively satisfactory imaging results can be obtained.

Second Embodiment

As described above, the existing depth data detection method can not obtain the depth data at more locations on the object to be detected, so that based on the existing depth data detection method, the depth data of the object to be detected can not accurately reflect the detailed depth information of the object surface. To this end, the present invention further provides a depth data detection system capable of acquiring depth data at more locations on an object to be detected, so that the depth data obtained based on the present invention can more fully reflect the depth information of the object to be detected.

Figure 5:
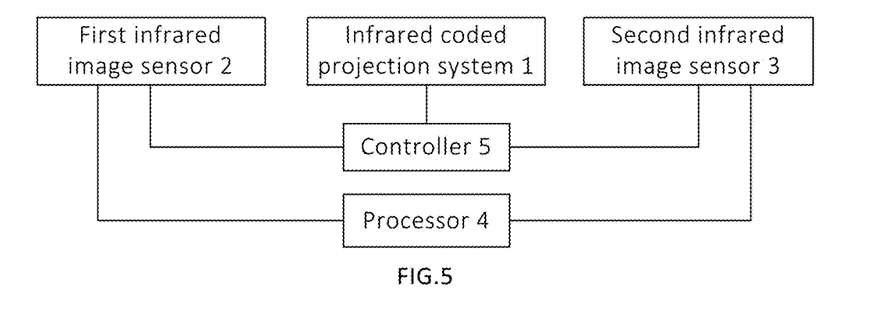
FIG. 5 shows a schematic connection relation diagram of a depth data detecting apparatus according to another embodiment of the present invention.

FIG. 5 shows a schematic connection diagram of a depth data detection apparatus according to one embodiment of the present invention.

As shown in FIG. 5, the depth data detection apparatus of the present invention includes an infrared coded projection system 1, a first infrared image sensor 2, a second infrared image sensor 3, a processor 4 and a controller 5.

The infrared coded projection system 1 in this embodiment of the present invention is configured to project a textured infrared beam to a space to be measured so as to form randomly distributed infrared light textures on the object to be detected in the space to be measured. The texture carried by the infrared beam projected by the infrared coded projection system 3 may be a random speckle texture, or a stripe encoded texture using a De Bruijn sequence, and of course other shapes of the texture.

The infrared coded projection system 1 has a plurality of operating modes. In each different operating mode, the infrared coded projection system 1 can project textured infrared beam to the space to be measured, at a different projection angle, from a different position, or at a different projection angle from a different position, in order to form a different distributed texture pattern on the object to be detected in the space to be measured in the different operating mode, that is, in different operating modes, a plurality of texture segments projected onto the object to be detected are distributed at different positions on the object to be detected. The texture information carried by the infrared light beam projected by the infrared coded projection system 1 in different operating modes may be the same or not.

There is a predetermined relative spatial position relationship between the first infrared image sensor 2 and the second infrared image sensor 3. For each operating mode in which the infrared coded projection system 1 is, the first infrared image sensor 2 and the second infrared image sensor 3 can image the space to be measured to obtain images of objects to be detected in the space to be measured under the corresponding operating modes. The image acquired by the first infrared image sensor 2 and the second infrared image sensor 3 is an infrared texture image formed by the textured infrared light beam being projected onto the object to be detected.

In different operating modes, the objects to be detected in the space to be measured have different distribution of texture patterns. Therefore, in different operating modes, the distributions of texture segments of the object to be detected in infrared texture images obtained by the first infrared image sensor 2 and the second infrared image sensor 3 are different.

The processor 4 is connected to the first infrared image sensor 2 and the second infrared image sensor 3, respectively, so as to obtain the infrared texture images captured by the first infrared image sensor 2 and the second infrared image sensor 3 in the plurality of operating modes. After processing, the depth data of each texture segment in the infrared texture image in different operating modes is obtained.

During data processing, the connection line of the optical imaging centers of the two image sensors can be taken as the baseline direction. In this case, the position difference of the texture segment images correspondingly formed in the two infrared texture images by the same texture segment is in the baseline direction in each operating mode. In this way, for each operating mode, the processor 4 can determine depth data of the texture segment, based on the predetermined relative spatial position relationship between the two infrared light image sensors, and the position difference of the texture segment images correspondingly formed in the two infrared texture images by the same texture segment in the infrared textures. Therefore, the processor 4 may determine the depth data of the multiple texture segments on the object to be detected, that is, determine the depth data of the infrared texture on the object to be detected relative to the two infrared light image sensors. Thus, the processor can obtain the depth data of each texture segment on the object to be detected in different operating modes. Because the distributions of the texture segments on the object to be detected are different in different operating modes, the processor 4 may fuse the depth data of each texture segment on the object to be detected that is determined in different operating modes, and use the fused depth data as the depth data of the object to be detected.

There are a number of ways to fuse the depth data determined in various operating modes. For example, in the case that the accuracy of the depth data of the object to be detected is less demanding, an average value of the depth data determined in multiple operating modes may be taken as the depth data of the object to be detected. For another example, in the process of fusing the depth data of the texture segments on the object to be detected that are determined in various operating modes, the average value can be taken as the depth data for a plurality of texture segments at the same position on the object to be detected, while the depth data of the texture segment may be used as the depth data of the corresponding position for those texture segments without overlapping. As a result, the depth data containing more locations of the object to be detected after fusion can more accurately reflect the depth information of the object to be detected.

The depth data detection apparatus shown in FIG. 5 may also optionally include a controller 5. In other words, the controller 5 in FIG. 5 is not necessary. The controller 5 is respectively connected with the infrared coded projection system 1 and two infrared light image sensors, that is the first infrared light image sensor 2 and the second infrared light image sensor 3, to control the two infrared light image sensors to capture synchronously. Besides, the controller 5 can switch the operating mode of the infrared coded projection system so that the infrared coded projection system 1 can be switched to the next operating mode after each exposure (capturing) of the two infrared light image sensors is completed.

Specifically, the controller 5 may trigger the two infrared image sensors to synchronously image by sending a trigger signal to the two infrared light image sensors, and switch the operating mode of the infrared coded projection system 1 by sending a switching signal to the infrared coded projection system 1. The trigger signal and the switch signal can be sent synchronously.

In this way, the infrared coded projection system 1 can switch to the next operating mode in response to the switching signal, and the first infrared image sensor 2 and the second infrared image sensor 3 can simultaneously respond to receiving the trigger signal from the trigger 5, capture the space to be measured in the next operating mode.

In another embodiment, the depth data detection apparatus of the present invention may include a trigger. The trigger is used to send a trigger signal to the two infrared image sensors to trigger two infrared image sensors to image, wherein the switch signal and the trigger signal are synchronized. In this way, the synchronization between the image sensor and the infrared light generator can be realized by ensuring that the switching signal is synchronized with the trigger signal. The synchronization of the trigger signal and the switching signal can be realized by, but not limited to, a synchronization trigger.

Figure 6:
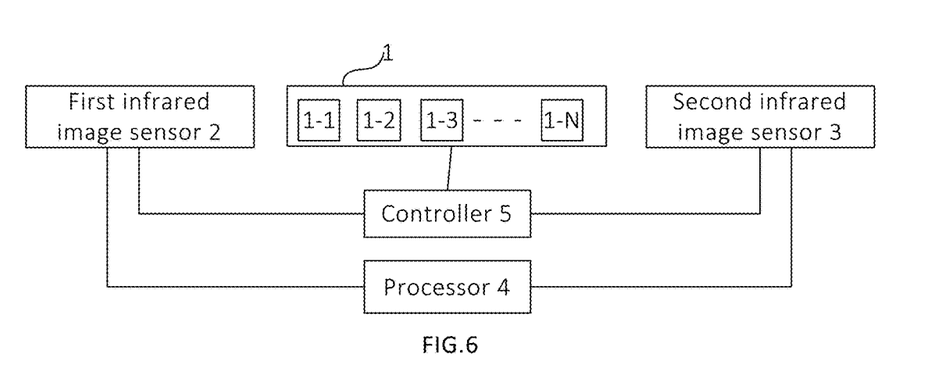
FIG. 6 shows a schematic connection relation diagram of a depth data detection apparatus according to another embodiment of the present invention.

FIG. 6 shows a schematic block diagram of a depth data detection apparatus according to another embodiment of the present invention. As shown in FIG. 6, in the depth data detection apparatus of the present invention, the infrared coded projection system 1 can be composed of a plurality of infrared coded projection devices at different positions (1-1, 1-2, 1-3, . . . 1-N in FIG. 6).

A plurality of infrared coded projection devices may be preferably disposed between the two infrared light image sensors so that the projection areas of the plurality of infrared coded projection devices can completely cover the common effective area of the two infrared light image sensors. Each infrared coded projection device can project a textured infrared beam toward the space to be measured. The infrared textures projected by different infrared coded projection devices may be the same or different.

The infrared coded projection apparatus may include an infrared light generator and an optical system. The infrared light generator generates infrared light, and the optical system processes the infrared light produced by the infrared light generator to turn it into a textured infrared beam. Depending on the actual needs, the optical system can have a variety of structures. When the optical system uses a different structure, the infrared light emitted by the infrared light generator through the optical system, can become infrared beam with different texture. For example, the optical system may include an optical beam splitter and an optical diffuser. The single beam infrared laser emitted by the infrared light generator passes through the optical beam splitter to become multiple infrared laser beams, and then the multiple infrared laser beams are incident on the optical diffuser to generate a plurality of stripe light beams or a plurality of speckles (the specific structure of the texture segments is related to the optical properties of the optical diffuser). As another example, optical systems such as holographic microlens arrays, optical masks, and/or other types of gratings may also be employed, whereby other structured light patterns may be produced.

The light emitting frequency of the infrared light generator (the pulse frequency of emitting infrared light) may preferably be an integral multiple of the frame rate of the infrared image sensor. This provides the basis for the simultaneous operation of the infrared light generator and the infrared image sensor. More preferably, the light-emitting frequency of the infrared light generator can be set to a higher value (for example, greater than 100 Hz, even up to several kHz). In this way, the light emitted by the infrared light generator is substantially constant with respect to the image sensor.

During the operating period of each infrared coded projection device, both the first infrared image sensor 2 and the second infrared image sensor 3 can image the space to be measured at least once. The images obtained by the first infrared image sensor 2 and the second infrared image sensor 3 are infrared texture images with a plurality of texture segments.

Because a plurality of infrared coded projection devices are respectively located at different positions, the texture patterns with different distributions of texture segments can be formed on the object to be detected by controlling different infrared coded projection devices to operate.

For example, the plurality of infrared coded projection devices may be controlled by the controller 5 to operate successively in a predetermined order, so that the texture patterns with different distributions can be projected to the objects to be detected in the space to be measured.

Specifically, after one exposure of the first infrared image sensor 2 and the second infrared image sensor 3 is completed, the controller 5 sends a switching signal to control the infrared coded projection device in operation to stop and switch the next infrared coded projection device according to a predetermined order. The controller 5 may also send a trigger signal to the first infrared image sensor 2 and the second infrared image sensor 3 simultaneously to trigger the first infrared image sensor 2 and the second infrared image sensor 3 to image the space to be measured.

Of course, the above functions of the controller 5 may also be implemented by other existing devices, which are not described herein again.

Third Embodiment

As previously mentioned, the infrared coded projection system of the present invention is equipped with at least two infrared light generators for projecting textured infrared beams. In a specific application, projection location, direction, mode of the projection system and combinations thereof can be designed to improve the usability of the depth data detection apparatus of the present invention.

Figure 7:
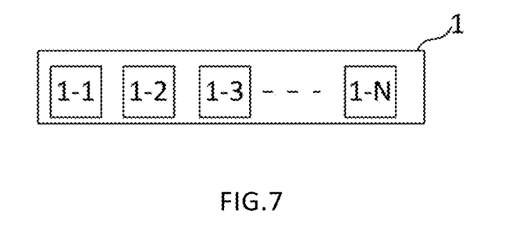
FIG. 7 is a schematic block diagram of an infrared coded projection system according to a further embodiment of the present invention.

FIG. 7 shows a schematic diagram of the composition of an infrared coded projection system according to one embodiment of the present invention. As shown in FIG. 7, the infrared coded projection system 1 includes a plurality of infrared coded projection devices (1-1, 1-2, . . . , 1-N), and the plurality of infrared coded projection devices are put into operation in a predetermined order.

The infrared coded projection device may include an infrared light generator and an optical system. Each infrared coded projection device may have an infrared light generator, while the optical system may be shared between different projection devices, or each projection device may be equipped with one optical system. When the optical system uses a different structure, the infrared light emitted by the infrared light generator through the optical system, can become infrared beam with a different texture. Optical systems, such as holographic microlens arrays, optical masks, or other types of gratings, may also be used, whereby infrared light with other different textures may be produced.

In one embodiment, different infrared coded projection devices may project textured infrared beam to different projection areas of the space to be measured. Taking an infrared coded projection system including two projection devices, that is, upper and lower infrared coded projection devices as an example, the upper code projection device is used to project an infrared light beam with texture information to the upper half of the space to be measured (see part A in FIG. 8), while the lower infrared coded projection device is used to project an infrared beam with texture information to the lower half of the space to be measured (see Part B in FIG. 8). The projection area of the upper infrared coded projection device and the projection area of the lower infrared coded projection device may have overlapping parts. In this way, each infrared coded projection device needs only to project infrared beam toward a part of the space to be measured, so that the imaging device (for example, two infrared image sensors) can acquire the infrared texture image containing the depth data of the space to be measured.

Figure 8:
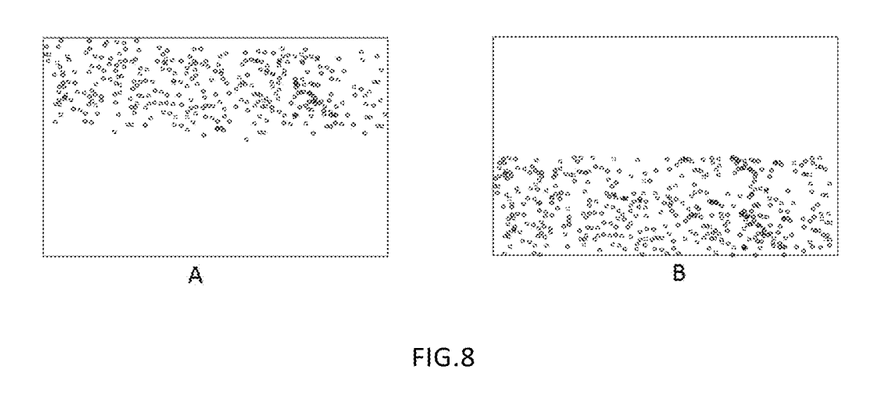
FIGS. 8 and 9 show schematic diagrams of projection results of a textured infrared beam projected onto a space to be measured by an infrared coded projection system according to an embodiment of the present invention.

Projection to different projection areas can be carried out according to the actual situation by different infrared coded projection devices simultaneous or not. The configuration of simultaneous projection, in the case of limited power infrared light generator, can cover the space to be measured as large as possible. The configuration of un-simultaneous projection projection can project infrared beam farther with the same operating power of the infrared coded projection device, and the illumination intensity of the infrared beam projected into the space to be measured can be higher. Since different infrared coded projection devices get in operation in turn, that is, each infrared coded projection device has a certain power-off time in each operating period, damage to the infrared code projector due to heat of the device caused by prolonged operation, such as deterioration, can be avoided, making each infrared light generator can reach its service life as much as possible. In addition, several sets of infrared coded projection devices can be configured according to actual needs. For example, each projection device in a set may simultaneously project different areas to ensure the range of the space to be measured, and each set get in operation in turn to secure the power-off time of each projection device.

In one embodiment, a plurality of infrared coded projection devices in the infrared coded projection system may project textured infrared beam to the same space to be measured simultaneously. Take an infrared coded projection system including two infrared coded projection devices as an example again, the first infrared coded projection device is used to project an infrared light beam with texture information (see Part A in FIG. 9) to a space to be measured, and the second infrared coded projection device is used to project an infrared light beam with texture information to the same space to be measured. The projection areas of the first infrared coded projection device and the second infrared coded projection device overlap (see Part B in FIG. 9). The projection textures of the two projection devices are staggered from one another according to certain constraints, and the projection textures themselves may be the same or different. In this way, under the condition that the total projected speckle density is constant, the speckle density projected by a single laser is reduced (in this case, reduce to half of the original density), to obtain speckles each with higher brightness; alternatively, the projection density of the entire target space can be increased with the speckle density projected by a single laser unchanged, so as to achieve more accurate depth detection and imaging. Preferably, a third infrared coded projection device may be additionally provided, and two of the three projection devices are in turn put into operation at the same time, thereby ensuring that each infrared coded projection device has a certain power-off time during its operating period, to achieve the life of infrared light generator as long as possible. Although an example of using two projection devices to project texture information to the same area is shown above for convenience of explanation, it can be understood that the number of projection devices that project texture to the same area at the same time may be N (N≥2), and the system can include at least N+1 projection devices to ensure the power-off time of each projection device.

Figure 9:
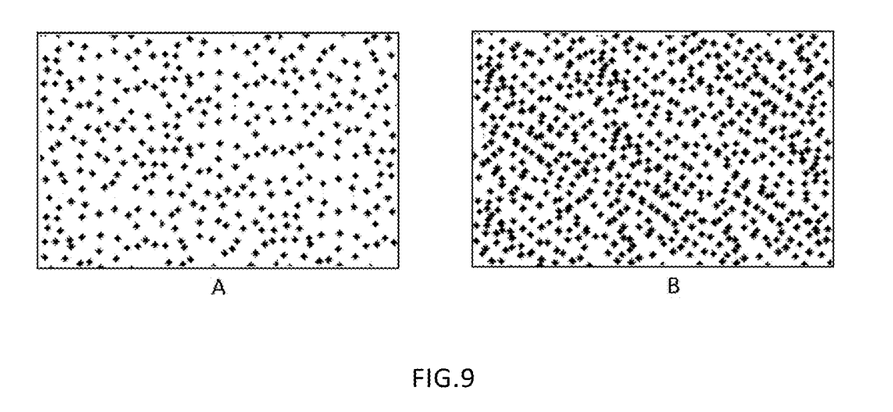

In an embodiment, the technical solutions shown in FIG. 8 and FIG. 9 may be combined. For example, the first and second infrared coded projection devices may be used to simultaneously project the infrared textures staggered with each other to the upper half of the space to be measured, and then use the third and the fourth infrared coded projection devices to simultaneously project the infrared textures staggered with each other to the lower half of the space to be measured, and so on. Such a combination can achieve the advantages of improving the brightness of each single speckle, enlarging the detection range and ensuring the power-off time. From the above disclosure, one skilled in the art can contemplate various combinations of the above solutions without departing from the scope of the present invention.

The texture carried by the infrared beam projected by the infrared coded projection system as described above with reference to FIGS. 7-9 may be a random speckle texture or a stripe encoded texture using a De Bruijn sequence, and of course may also be other shapes of the texture. A textured infrared beam projected by an infrared coded projection system can form a textured pattern with a certain distribution in the space to be measured.

For the embodiment in FIG. 8, the infrared coded projection system 1 has a predetermined operating period, and operates in a plurality of operating modes in each operating period, and each operating mode has a different operating time period. In a different operating mode, the infrared coded projection system 1 projects a textured infrared beam to a different projection area in the monitoring space. The operating time period of different operating modes can overlap, that is, more than one operating mode can exist at a time. In addition, the area projected by the infrared coded projection system 1 in different operating modes may also have overlapping areas. Further, the texture information carried by the infrared light beam projected by the infrared coded projection system 1 in different operating modes may be the same or not.

Imaging devices (e.g., two infrared image sensors) can be used to image the monitoring space at a predetermined frame period to form infrared texture images containing texture information, the length of the operating period of the infrared coded projection system 1 is the same to is to the frame period of the imaging device, which allows the imaging devices to image the space to be measured for each operating period of the infrared coded projection system.

Further, the projection area in a different operating mode of the infrared coded projection system 1 respectively corresponds to a different pixel area of the image sensors, the operating time period of each operating mode of the infrared coded projection system 1 at least partially overlaps with the exposure time period of the pixel area of the image sensors corresponding to the operating mode so that each pixel area of the image sensors can image the reflected light of the infrared beam projected in its corresponding operating mode.

Depending on the different structure of the imaging device used, the operating mode of the infrared coded projection system 1 during each operating period is also different. Specifically, when a global exposure is used by the imaging device (that is, all pixel areas of the imaging device have the same exposure period and are exposed simultaneously during the exposure period in each frame period of the imaging device), the infrared coded projection system 1 traverse a variety of operating modes during the exposure period. In this way, each frame of image captured by the imaging device for the space to be measured is an infrared texture image containing texture information. Based on the related information of the texture segments in the infrared texture images, the depth information of the space to be measured can be determined.

For the embodiment of FIG. 9, the infrared coded projection system 1 has a predetermined operating period. In a different operating period, at least two projection devices of the infrared coded projection system 1 project the textured infrared light beams to the space to be measured. Here, at least two different projection devices (corresponding to at least two infrared light generators) can be used in a different operating period. Further, the texture information carried by the infrared beams simultaneously projected by the at least two projection devices may be the same or not.

Preferably, the infrared coded projection system may include at least three infrared light generators. At a different operating period, the controller can alternately switch at least two of the at least three infrared light generators into operation, and in each operating period, at least two of the at least three infrared light generators project textured infrared beams to the same space to be measured. For example, an infrared coded projection system may include three infrared light generators A, B, and C and switch the two infrared light generators into operation in turn, for example, in the order AB, BC, AC, thereby avoiding the impact of prolonged operating hours on the service life of each infrared light generator.

Imaging devices (e.g., two infrared image sensors) are used to image the monitoring space at a predetermined frame period to form an infrared texture image containing texture information, the length of the operating period of the infrared coded projection system 1 is the same to is to the frame period of the imaging device, which allows the imaging devices to image the space to be measured for each operating period of the infrared coded projection system.

In addition, the configuration of the infrared coded projection system shown in FIGS. 7-9 is also applicable to a depth detection device including a monocular imaging system (i.e., including only a single infrared image sensor), in addition to the binocular imaging system used in the present invention. The combination principle of the above infrared coded projection system and the monocular imaging system can be understood by those skilled in the art after reading the disclosure of the present invention, and details are not described herein again.

Fourth Embodiment

In use, if an infrared light generator fails, the capture of the frame image of the image sensor will be affected during the operation of the infrared light generator, thereby affecting the measurement of the depth data. Therefore, there is also a need for a configuration capable of coping with a sudden failure of an infrared light generator.

Figure 10:
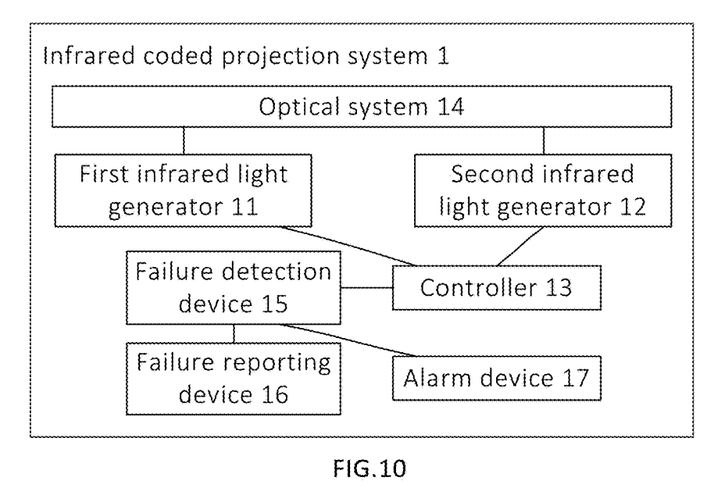
FIG. 10 is a schematic block diagram of an infrared coded projection system according to another embodiment of the present invention.

Based on the above considerations, FIG. 10 is a schematic block diagram of an infrared coded projection apparatus according to another embodiment of the present invention. Compared with FIG. 1, the depth data detection apparatus of the present invention may further include a failure detection device 15, a failure reporting device 16 and an alarm device 17. Although the devices 15-17 are shown for the sake of simplicity and clarity in the drawings, in various embodiments, the infrared coded projection device of the present invention may include only the failure detection device 15, include both the failure detection device 15 and the failure reporting device 16, include the fault detection device 15 and the alarm device 17, or all of the failure detection device 15, the failure reporting device 16 and the alarm device 17.

Failure detection device 15 is used to detect whether there is a failure among the infrared light generators. When the failure detection device 15 detects a failed infrared light generator, the controller deletes the failed infrared light generator from the infrared light generator operating sequence cycle and activates the next infrared light generator in the infrared light generator operating sequence cycle.

In this way, the failed infrared light generator can be stopped. This ensures that there is a infrared light generator in operation at any time, and avoids the apparatus unable to detect the depth normally because of the no-lighting period.

Failure detection device 15 can comprise an infrared light detection means for detecting whether the textured infrared beam exists in the space to be measured.

When the controller controls one of the at least two infrared light generators to generate infrared light and the infrared light detection means does not detect the textured infrared beam, the infrared light generator is regarded as having failed.

Taking into account the accidental factors lead to detection errors or infrared light generator automatically resume normal after a period of failure, after a predetermined period of time has elapsed since the failure detection device detected the failed infrared light generator, the controller activates the failed infrared light generator and then failure detection device 15 redetects whether the infrared light generator is still in failure again.

The controller reputs the infrared light generator back into the operating sequence cycle after failure detection device 15 redetected and determined that the infrared light generator is no longer in failure.

The infrared coded projection system of the present invention may further include failure reporting device 16 connected to failure detection device 15.

Failure reporting device 16 reports the infrared light generator damage if failure detection device 15 determines that the infrared light generator is still in failure after certain times of redetections.

This will promptly report the damaged infrared light generator to the user for subsequent maintenance.

Failure reporting device 16 may report in the form of voice, text, LED display, or the like.

The infrared coded projection system of the present invention can also be provided with alarm device 17 for raising an alarm when failure detection device 15 determines that all the infrared light generators are in failure, in order to remind the user to terminate the monitor and repair the apparatus.

In another embodiment, the depth data detection apparatus of the present invention may also be arranged to directly include a infrared light detection device. The infrared light detecting device may be disposed in a projection direction of the infrared coded projection system so as to be used for determining which infrared coded projection device is in operation among the plurality of infrared coded projection devices, that is, can be used to determine the serial number of infrared coded projection device in operation. In this way, during system operation, it is convenient to know which infrared coded projection device(s) is in operation.

Specifically, an infrared light detecting device may be disposed in projection direction of each infrared coded projection device to detect the infrared coded projection device in operation state (an infrared light detecting device may be disposed at a corner of the front end of each laser). In addition, it is also possible to determine which infrared coded projection device is in operation state by providing only one infrared light detecting device.

In the situation that only one infrared light detection device is provided for detecting which infrared coded projection device is in operation state, the infrared light beams projected by the plurality of infrared coded projection devices can be modulated in different ways in advance. For example, the infrared beams projected by the plurality of infrared coded projection devices may be amplitude modulated, phase modulated, frequency modulated, or intensity modulated with different parameters in advance and the modulation information corresponding to each infrared coded projection device may be stored. Then, the infrared light signal detected by the infrared light detecting device is demodulated and processed, and the infrared light signal processed is compared with the stored modulation information to determine the infrared coded projection device in operation state. In addition, the plurality of infrared coded projection devices may also emit infrared light with different frequencies. In this case, which infrared coded projection device is in operation state can be determined by analyzing the frequency of the infrared light signal detected by the infrared light detection device.

In the situation that in the projection direction of each of the infrared coded projection devices is provided an infrared light detecting device to detect which infrared coded projection device is in operation, when an infrared light detecting device receives infrared light signals, it can be determined that the infrared coded projection device corresponding to the infrared light detecting device is in operation.

The depth data detecting apparatus of the present invention has been described in detail above with reference to FIGS. 1-10. An application example of the principle of the present invention in the field of security will be described below with reference to FIGS. 11-12.

Example 1

Figure 11:
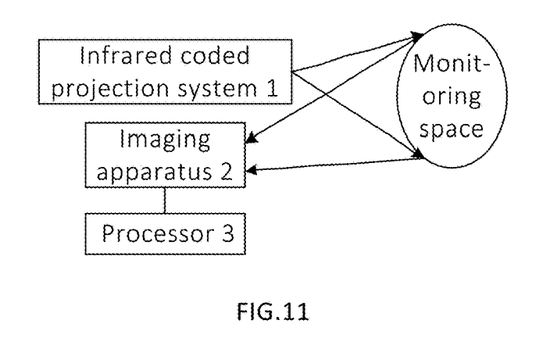
FIG. 11 shows a schematic block diagram of a depth data monitoring apparatus according to one embodiment of the present invention.

FIG. 11 is a schematic block diagram of a depth data monitoring apparatus according to one embodiment of the present invention.

As shown in FIG. 11, the depth data monitoring apparatus of the present invention includes an infrared coded projection system 1, an imaging apparatus 2 and a processor 3.

The infrared coded projection system 1 is configured to project the encoded textured infrared beam to the monitoring space. The texture carried by the infrared light beam projected by the infrared coded projection system 1 can be a random speckle texture, can be a stripe coded texture obtained by using De Bruijn sequence, or can of course also be textures of other shapes. The textured infrared beam projected by the infrared coded projection system 1 can form a textured pattern with a certain distribution in the monitoring space.

The infrared coded projection system 1 has a predetermined operating period, and operates in a plurality of operating modes in each operating period, and each operating mode has different operating time period. In different operating modes, the infrared coded projection system 1 projects textured infrared beams to different projection areas in the monitoring space.

The operating time period of different operating modes can overlap, that is, more than one operating mode can exist at a time. In addition, the areas projected by the infrared coded projection system 1 in different operating modes may also have overlapping portion. Further, the texture information carried by the infrared light beam projected by the infrared coded projection system 1 in different operating modes may be the same or different.

In this way, in the situation that the operating power of the infrared coded projection system 1 is constant, the method of projecting a textured infrared beam to the monitoring space is adopted to make the projected infrared beam be more bright and the max distance that the projected infrared beam can reach be more further.

The imaging device 2 is used for imaging the monitoring space at a predetermined frame period to form infrared texture images containing texture information. The length of the operating period of the infrared coded projection system 1 is the same as the length of the frame period of the imaging device 2, so that the imaging device 2 can be image the monitoring space at each operating period of the infrared coded projection system 1.

Further, the projection areas of the different operating modes of the infrared coded projection system 1 respectively correspond to different pixel areas of the imaging device 2, and the operating time period of each operating mode of the infrared coded projection system 1 at least partially overlap with the exposure time period of the pixel areas of the imaging device 2 corresponding to the operating mode, so that each pixel area of the imaging device 2 can image the reflected light of the infrared beam projected in its corresponding operating mode.

According to the different structure of the imaging device 2 used, the operation modes of the infrared coded projection system 1 during each operating period are also different. Specifically, when the global exposure is used by the imaging device 2 (i.e., all the pixel areas of the imaging device 2 have the same exposure period and are exposed simultaneously during the exposure period in each frame period of the imaging device 2), the infrared coded projection system 1 traverses multiple operating modes during the exposure period. In this way, each frame of image formed by the imaging device 2 imaging the monitoring space is an infrared texture image containing texture information. Based on the related information of the texture segments in the infrared texture image, the depth information of the monitoring space can be determined.

Figure 12:
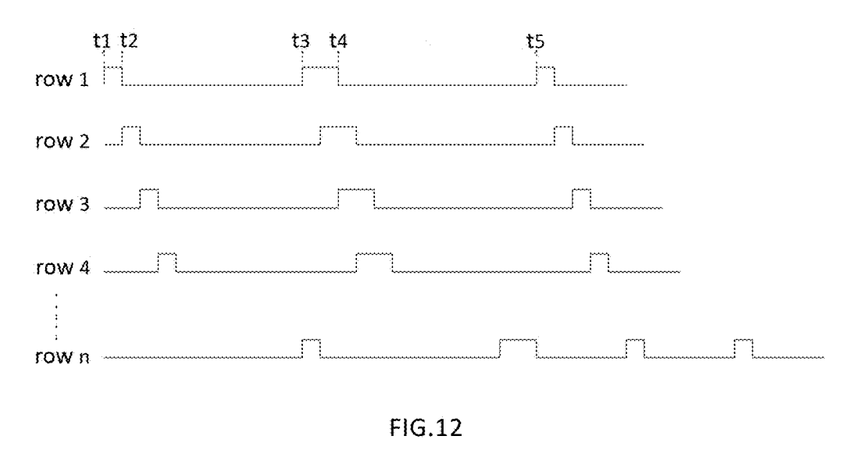
FIG. 12 shows a schematic conceptual diagram of an imaging process of the imaging device according to one embodiment of the present invention.

In addition, the imaging device 2 may also employ a roller shutter sensor that can operate in a triggering mode. In this case, the depth data monitoring apparatus of the present invention may further include trigger signal generating device. In the trigger mode, the trigger signal generating device sends a trigger signal to the imaging device 2 to trigger the imaging device to reset one row of pixels. In the trigger mode, the imaging process of the imaging device 2 may be as shown in FIG. 12. According to the trigger signal of the trigger signal generating device, the pixels of the imaging device 2 may perform the reset operation sequentially row by row. The time difference between two adjacent reset operations of each row of pixels is a frame period (shown as t1 to t5). One row of pixels starts the exposure (t2 to t3, t4 to t5) after the reset operation, and performs a data read operation (t3 to t4) on the pixel row after an effective exposure time (the effective exposure time corresponds to t2 to t3 in the figure). As shown in FIG. 9, after the data read operation is completed, the exposure may continue (t4 to t5), but since the read operation has been completed, the exposure period between the exposure thereafter and the next exposure is an invalid exposure time (invalid exposure time corresponds to t4 to t5 in the figure). In the situation that the exposure process of the image sensor shown in FIG. 12 is used by the imaging device 2, the projection areas of each operation mode of the infrared coded projection system 1 respectively correspond to a plurality of pixel rows of the imaging device 2, wherein the projected areas of different operating modes started in a predetermined time sequence are distributed from top to bottom (projected areas may have overlapping portions). The operating time period of each operating mode includes an effective exposure period of each row of the plurality of pixel rows corresponding to the operating mode, and the operating mode is stopped at least part of the time during the frame period other than the valid exposure period.

It should be understood that the two operating modes of the imaging device 2 described above are only preferred embodiments of the present invention. For the present invention, the imaging device 2 may have other operating modes, and details are not described herein again.

The depth data monitoring device shown in FIG. 11 may also optionally include a processor 3 (in other words, the processor 3 in FIG. 11 is not necessary).

The processor 3 is configured to analyze the infrared texture image formed by the imaging device 2 in each frame period to determine the depth data of each texture segment in the infrared texture image relative to the imaging device, so as to determine the depth data of the monitoring space. The processor 3 may have a variety of ways to determine the depth data of the texture segments in the infrared texture image formed by the imaging device 2.

For example, in the situation that the imaging device 2 includes one infrared image sensor, the processor can determine the depth data of each texture segment in the infrared texture image, that is, the depth data of the monitoring space, according to the reference surface texture of the infrared texture projected by the infrared coded projection system in different operating modes at a plurality of known depth distances. For another example, in the situation that the imaging device 2 includes two infrared light image sensors (the first infrared light image sensor 2-1 and the second red light image sensor 2-2), the two infrared light image sensors have a predetermined relative spatial position, and are respectively used to image the monitoring space. In this case, based on the predetermined relative spatial position relationship between the two infrared light image sensors, and the position difference of the texture segment images correspondingly formed in the two infrared texture images by the same texture segment in the infrared textures, the processor 3 can determines the depth data of the texture segment relative to the two infrared image sensors, so as to determine the depth data of each texture segment in the infrared texture image, that is the depth data of monitoring space.

In the situation that the imaging device 2 includes two infrared light image sensors, the two infrared light image sensors may operate in the trigger mode as described above. Two infrared light image sensors can be respectively connected with the trigger signal generating device 4. The triggering signal is sent to the two infrared image sensors simultaneously by the triggering signal generating device 4 so that the two infrared image sensors can synchronously image the monitoring space.

So far, the basic structure and operating process of the depth data monitoring apparatus of the present invention have been described in detail. It can be seen from the above description that the infrared coded projection system in the depth data monitoring apparatus of the present invention projects the infrared beam with texture information to different areas of the monitoring space by means of distributed projection, which enables the imaging device in the depth data monitoring device to obtain the infrared texture image with the texture information by imaging the monitoring space. By analyzing the infrared texture image, the depth data of the monitoring space can be obtained.

The function of the infrared coded projection system 1 in the depth data monitoring apparatus of the present invention can be implemented by one infrared coded projection device, but is preferably implemented by multiple infrared coded projection devices. The following describes the case that the infrared coded projection system includes multiple infrared coded projection devices. The case of an infrared coded projection system composed of one infrared coded projection device will not be described in detail.

The infrared coded projection system 1 can also include a plurality of infrared coded projection devices (1-1, 1-2, . . . , 1-N) as shown in FIG. 7, and the plurality of infrared coded projection devices are put into operation in a predetermined order. In this case, the above-mentioned multiple operating modes correspond to multiple infrared coded projection devices respectively. That is, in a different operating mode, a different infrared coded projection device projects a infrared light beam to a different area of the monitoring space. In this way, when the imaging process of the imaging device 2 is as shown in FIG. 12, the projection area of each infrared coded projection device corresponds to a plurality of pixel rows of the imaging device 2, so that after an effective exposure period of the plurality of pixel rows corresponding to an infrared coded projection device within one frame period ends, the infrared coded projection device may stop operating and wait until the effective exposure of the corresponding pixel rows in next frame period to start operation.

Taking the infrared coded projection system 1 including two infrared coded projection devices, upper and lower infrared coded projection devices, as an example, the upper infrared coded projection device is used to project an infrared light beam with texture information to the upper half of the monitoring space (see also Part A in FIG. 8) and the lower infrared coded projection device is used to project an infrared light beam with texture information to the lower half of the monitoring space (see also Part B in FIG. 8). The projection areas of the upper infrared coded projection device and the lower infrared coded projection device may have overlapping parts. In this way, each infrared coded projection device only needs to project an infrared beam to a part of the monitoring space, so that the imaging apparatus can capture the infrared texture image of the monitoring space containing the depth data.

In summary, without affecting the acquisition of infrared texture images of the monitoring space containing the depth data, comparing to the scheme of using a single infrared coded projection device to project the entire monitoring space, the scheme of using multiple infrared coded projection devices to project to different projection areas of the monitoring space allows the infrared coded projection device in the embodiment of the present invention project a infrared beam farther and the intensity of the infrared beam projected to the monitoring space is higher, while the operating powers of the infrared coded projection devices stay unchanged. In addition, for a scheme adopting multiple infrared coded projection devices, each infrared coded projection device only needs to operate a part of time in one operating period, that is, each infrared coded projection device has a certain power-off period in each operating period, so as to damage to the infrared coded projection device due to heat of the device caused by prolonged operation, such as deterioration, can be avoided, making each infrared light projection device can reach its service life as much as possible.

Further, the infrared coded projection device may include an infrared light generator and an optical system. The infrared light generator generates infrared light, and the optical system processes the infrared light produced by the infrared light generator to turn it into a textured infrared beam. Depending on the actual needs, the optical system can have a variety of structures. When the optical system uses a different structure, the infrared light emitted by the infrared light generator through the optical system, can become infrared beam with different texture. For example, the optical system may include an optical beam splitter and an optical diffuser. The single beam infrared laser emitted by the infrared light generator passes through the optical beam splitter to become multiple infrared laser beams, and then the multiple infrared laser beams are incident on the optical diffuser to generate a plurality of stripe light beams or a plurality of speckles (the specific structure of the texture segments is related to the optical properties of the optical diffuser). As another example, optical systems such as holographic microlens arrays, optical masks, and/or other types of gratings may also be employed, whereby other structured light patterns may be produced.

In practice, in addition to monitoring the three-dimensional information of the space, we also need to acquire the color image information of the monitoring space so as to obtain the recorded video reference and retrieval when needed. Therefore, for the depth data monitoring apparatus in the above embodiments, the system may further include a visible light imaging device.

The visible light imaging device is used for imaging the monitoring space. The image formed by the visible light imaging device is an image containing color information of the monitoring space. The information processor can fuse the determined depth data of the monitoring space and the color space of the monitoring space, and thus the images containing the depth data of the monitoring space and color information can be obtained.

In addition, the visible light imaging device is generally capable of detecting infrared light. Therefore, in order to avoid the interference caused by the infrared light projected by the infrared coded projection system, an infrared light filtering device may be provided at the front of the visible light imaging device for filtering infrared light. The infrared light filtering device is preferably configured to filter out infrared light having a wavelength between 780 nm and 1100 nm.

Example 2

In a specific application, the depth data monitoring apparatus may also adopt for example the configuration as shown in FIG. 9, to include the function of projecting infrared beams to the same monitoring space at the same time. Accordingly, in one embodiment, a depth data monitoring apparatus may include an infrared coded projection system, an imaging device, and a processor. The infrared coded projection system includes at least three infrared coded projection devices and has a predetermined operating period. In different operating modes, at least two infrared coded projection devices of the at least three infrared coded projection devices are switched into operation in turn, to project infrared light beam with infrared texture to the same monitor space. The imaging device is used to image the monitoring space with a predetermined frame period, to obtain an infrared texture image containing texture information, the length of the operating period is the same as the length of the frame period, so that the imaging device images the monitoring space in each operating period of the infrared coded projection system. The processor can be configured to analyze the infrared texture image obtained by the imaging device in each frame period, to determine the depth data of each texture segment in the infrared texture image relative to the imaging device.

Here, each infrared coded projection device includes an infrared light generator as described above. The optical system used for forming the infrared texture may be shared by different infrared coded projection devices or may be separately configured for each of the infrared coded projection devices.

Similarly, the depth data monitoring apparatus in this embodiment may also have two infrared light image sensors, a visible light imaging device, and/or an infrared light filtering device. These components have been explained in conjunction with example 1, and will not be repeated here.

The depth data detection apparatus and the depth data monitoring apparatus of the present invention have been described above in detail with reference to the accompanying drawings.

In addition, the method according to the invention can also be implemented as a computer program comprising computer program code instructions for carrying out the above-mentioned steps as defined in the above method of the invention. Alternatively, the method according to the invention may also be implemented as a computer program product comprising a computer-readable medium having stored thereon a computer for performing the above-described functions defined in the above method of the invention program. Those of skill in the art will also understand that the various illustrative logical blocks, modules, circuits, and algorithm steps described in connection with the disclosure herein may be implemented as electronic hardware, computer software, or a combination of both.

The flowchart and block diagrams in the figures illustrate the architecture, functionality, and operation of possible implementations of systems and methods in accordance with various embodiments of the present invention. In this regard, each block in the flowchart or block diagram can represent a module, program segment, or portion of code, and the module, program section, or portion of the code includes one or more executable instructions for implementing the specified logical functions. It should also be noted that in some alternative implementations, the functions labeled in the blocks may occur in an order other than the one labeled in the drawings. For example, two consecutive blocks may in fact be executed substantially in parallel, and sometimes they may be executed in the reverse order, depending on the function involved. It is also to be noted that each block of the block diagrams and/or flowchart, and combinations of blocks in the block diagrams and/or flowchart, can be implemented by special purpose hardware-based systems that perform the specified functions or operations, or can be implemented using a combination of dedicated hardware and computer instructions.

The various embodiments of the present invention have been described above. The foregoing description is exemplary, not exhaustive, and is not intended to be limited to the disclosed embodiments. Many modifications and variations will be apparent to those skilled in the art without departing from the scope and spirit of the illustrated embodiments. The terminology used herein was chosen to best explain the principles of the embodiments, the practical application, or improvements in technology in the marketplace or to enable others of ordinary skill in the art to understand the embodiments disclosed herein.

The invention claimed is:

1. A depth data detection apparatus, comprising:
   an infrared coded projection system for projecting a textured infrared beam to a space to be measured to form randomly distributed infrared textures on an object to be detected in the space to be measured;
   two infrared image sensors for respectively imaging the space to be measured so as to form two infrared textured images, the two infrared image sensors have a predetermined relative spatial position relationship therebetween, so that depth data of infrared textures relative to the two infrared image sensors can be determined based on a position difference of texture segment images correspondingly formed in the two infrared texture images by the same texture segment in the infrared textures and the predetermined relative spatial position relationship,
   the infrared coded projection system comprises:
      at least two infrared light generators for generating infrared light respectively;
      an optical system, wherein the infrared light generated by the infrared light generator forms the textured infrared beam after passing through the optical system;
      a controller for controlling and switching the at least two infrared light generators such that the at least two infrared light generators alternately generate infrared light;
   wherein the infrared coded projection system has multiple operating modes, in different operating modes, the controller switches different infrared light generators into operation, and in each operating mode, a different infrared light generator projects textured infrared beams at a different projection angle and/or from a different position to the space to be measured, in order to form randomly distributed infrared texture on the object to be detected in the space to be measured;
   wherein for each operating mode, the two infrared image sensors are configured to image the space to be measured respectively, to form two infrared textured images;
   wherein the depth data detection apparatus further comprises:
   a processor that is configured to:
      acquire two infrared texture images obtained by using the two infrared image sensors in different operating modes,
      for each operating mode, determine depth data of the infrared textures relative to the two infrared image sensors in the operating mode, based on the predetermined relative spatial position relationship between the two infrared image sensors and the position difference of the texture segment images correspondingly formed in the two infrared texture images by the same texture segment in the infrared textures,
      fuse the depth data determined in multiple operating modes to obtain new depth data as final depth data of the object to be detected.

2. The depth data detection apparatus according to claim 1, wherein,
   the controller is respectively connected with the infrared coded projection system and the two infrared image sensors, and is configured to:
   control the two infrared image sensors to perform synchronous imaging, and
   switch the infrared coded projection system to a next operation mode after exposure of each frame of the two infrared image sensors ends.

3. The depth data detection apparatus according to claim 1, wherein,
   the controller triggers the two infrared image sensors to image by sending a trigger signal to the two infrared image sensors,
   the controller switches a different infrared light generator to operate by sending a switching signal to the infrared coded projection system,
   wherein the trigger signal is synchronized with the switching signal.

4. The depth data detection apparatus according to claim 1, wherein,
   the infrared coded projection system has a predetermined operating period, and operates in multiple operating modes in each operating period, each operating mode has a different operating time period, the controller switches a different infrared light generator into operation in a different operating mode, and the different infrared light generators projects textured infrared beams to different projection areas of the space to be measured in each operating mode;
   the two infrared image sensors are configured to image the space to be measured at a predetermined frame period to form an infrared texture image containing texture information, a length of the operating period is the same as the length of the frame period, the projection area in a different operating mode of the infrared coded projection system respectively corresponds to a different pixel area of the two infrared image sensors, the operating time period of each operating mode of the infrared coded projection system at least partially overlaps with an exposure time period of the pixel area of the two infrared image sensors corresponding to the operating mode so that each pixel area of the two infrared image sensors can image reflected light of the infrared beam projected in its corresponding operating mode.

5. The depth data detection apparatus according to claim 1, wherein,
   the infrared coded projection system comprises at least three infrared light generators and has a predetermined operating period, the controller alternately switching at least two of the at least three infrared light generators into operation in a different operating period, and at least two of the at least three infrared light generators project a textured infrared beam to the same space to be measured in each operating period.

6. The depth data detection apparatus according to claim 1, wherein, the infrared light generated by the at least two infrared light generators is modulated in different ways by the optical system, and wherein, the depth data detection apparatus further comprises an infrared light detection device disposed in a projection direction of the infrared coded projection system, so that it can be determined which infrared light generator is in operation by analyzing infrared light signal received by the infrared light detecting device.

7. The depth data detection apparatus according to claim 1, further comprising:
a failure detection device for detecting whether there is a failed infrared light generator among the at least two infrared light generators,
the controller maintains an infrared light generator operating sequence cycle composed of the at least two infrared light generators, and the controller sequentially switches the infrared light generators to operate according to the infrared light generator operating sequence cycle,
when the failure detection device detects a failed infrared light generator, the controller deletes the failed infrared light generator from the infrared light generator operating sequence cycle and activates the next infrared light generator in the infrared light generator operating sequence cycle.

8. The depth data detection apparatus according to claim 7, wherein the failure detection device comprises:
an infrared light detection means for detecting whether the textured infrared beam exists in the space to be measured, and wherein
when the controller controls one of the at least two infrared light generators to generate infrared light and the infrared light detection means does not detect the textured infrared beam, the infrared light generator is regarded as having failed.

9. The depth data detection apparatus according to claim 7, wherein,
after a predetermined period of time has elapsed since the failure detection device detected the failed infrared light generator, the controller activates the failed infrared light generator and the failure detection device redetects whether the infrared light generator is still in failure,
the controller puts the infrared light generator into the infrared light generator operating sequence cycle again after the failure detection device determined after redetection that the infrared light generator is no longer in failure.

10. The depth data detection apparatus according to claim 9, further comprising:
a failure reporting device connected to the failure detection device, for reporting damage of the infrared light generator if the failure detection device determines that the infrared light generator is still in failure after certain times of redetections.

11. The depth data detection apparatus according to claim 9, further comprising:
an alarm device for raising an alarm when said failure detection device determines that the at least two infrared light generators are all in failure.

12. The depth data detection apparatus according to claim 1, wherein,
a line connecting optical imaging centers of the two infrared image sensors is a baseline direction, and the position difference of the texture segment images correspondingly formed in the two infrared texture images by the same texture segment is in the baseline direction.

13. A depth data monitoring apparatus, comprising:
an infrared coded projection system, having a predetermined operating period and operates in multiple operating modes in each operating period, each operating mode has a different operating time period, and in each operating mode, the infrared coded projection system projects textured infrared beams to a different projection area in a monitoring space;
an imaging device for imaging the monitoring space at a predetermined frame period, to form an infrared texture image containing texture information, a length of the operating period is the same as the length of the frame period, the projection area in a different operating mode of the infrared coded projection system respectively corresponds to a different pixel area of the imaging device, the operating time period of each operating mode of the infrared coded projection system at least partially overlaps an exposure time period of the pixel area of the imaging device corresponding to the operating mode, so that each pixel area of the imaging device can image reflected light of the infrared beam projected in its corresponding operating mode;
a processor configured to analyze infrared texture images imaged by the imaging device in each frame period, to determine depth data of each texture segment in the infrared texture image relative to the imaging device,
the infrared coded projection system includes multiple infrared coded projection devices, and infrared light beams are projected by a different infrared coded projection device in a different operating mode;
a trigger signal generating device, for transmitting a trigger signal to the imaging device, in order to trigger a reset operation of the imaging device for one pixel row thereof,
wherein the imaging device, in response to the trigger signal, sequentially performs a reset operation on its pixels row by row, a time difference between two adjacent reset operations of each pixel row is the frame period, each pixel row begins to be exposed after a reset operation, and a data read operation for the pixel row is performed after the same effective exposure time elapses,
the projection area in each operating mode of the infrared coded projection system respectively corresponds to several pixel rows of the imaging device,
the operating time period of each operating mode includes an effective exposure time period of each pixel row in the several pixel rows corresponding to the operating mode, and the operating mode is stopped at at least part of the frame period other than the effective exposure time period.

14. The depth data monitoring apparatus according to claim 13, wherein,
in each of the frame periods, all the pixel areas of the imaging device have the same exposure time period and are exposed simultaneously during the exposure time period, and wherein the infrared coded projection system traverses the multiple operating modes during the exposure time period.

15. The depth data monitoring apparatus according to claim 13, wherein the imaging device includes two infrared image sensors, the two infrared image sensors have a predetermined relative spatial position relationship therebetween and respectively image the monitoring space, the processor is configured to determine the depth data of a texture segment relative to the two infrared image sensors based on the predetermined relative spatial position relationship and a position difference of the texture segment images correspondingly formed in the infrared texture images by the same texture segment in infrared texture, so as to determine the depth data of each texture segment in the infrared texture images.

16. The depth data monitoring apparatus according to claim 13, further comprising:
a visible light imaging device for imaging the monitoring space, an image imaged by the visible light imaging device contains color information of the monitoring space,
wherein the processor is configured to obtain an image containing depth data and color information of the monitoring space by fusing the depth data and the color information of the monitoring space.

17. The depth data monitoring apparatus of claim 16, further comprising:
an infrared light filtering device disposed at a front end of the visible light imaging device for filtering infrared light.

* * * * *